(12) United States Patent
Alguire (10) Patent No.: US 9,288,974 B2
(45) Date of Patent: Mar. 22, 2016

(54) SHOT APPLICATOR DEVICE (76) Inventor: Bryan Alguire, Barneveld, NY (US)

( * ) Notice: Subject to any disclaimer, the term of this patent is extended or adjusted under 35 U.S.C. 154(b) by 508 days.

(21) Appl. No.: 13/570,760

(22) Filed: Aug. 9, 2012

(65) Prior Publication Data
US 2013/0048665 A1 Feb. 28, 2013

Related U.S. Application Data (60) Provisional application No. 61/527,314, filed on Aug. 25, 2011.

(51) Int. Cl.
A01K 97/00 (2006.01)
A01K 95/02 (2006.01)
A01K 85/00 (2006.01)
A01K 97/06 (2006.01)

(52) U.S. Cl.
CPC .............. A01K 95/02 (2013.01); A01K 85/005 (2013.01); A01K 97/00 (2013.01); A01K 97/06 (2013.01)

(58) Field of Classification Search
CPC ....... A01K 95/00; A01K 95/02; A01K 91/04; A01K 91/03; A01K 97/06; A01K 95/005; A01K 97/00; B65C 7/00; B65C 2201/00; B65C 7/001; A61M 37/0069; A61M 37/00; A61M 2005/2013; A61M 31/00; A61M 37/0015; A61M 5/2033; A61M 2037/0061; A61M 2025/0086; A61M 2025/009; A61M 2205/04; A61M 5/14276; A61M 5/32; A61M 5/329; D05B 57/14; D05B 69/30; D05B 3/025; D05B 55/08; D05B 65/00; D05C 15/10; D05C 15/20; D05C 9/02
USPC .......... 43/4, 42.39, 42.22, 43.1, 43.14, 44.87, 43/44.89, 55; 7/106; 604/60–64; 227/67, 227/68, 73; 606/216; 124/41.1, 51.1
See application file for complete search history.

(56) References Cited

U.S. PATENT DOCUMENTS

| 834,261 | A | 10/1906 | Chambers |
| 2,790,341 | A | 4/1957 | Keep et al. |
| 2,829,550 | A | 4/1958 | Hamshaw |
| 3,058,465 | A | 10/1962 | Bell |
| 3,067,499 | A | 12/1962 | Shaw |
| 3,572,335 | A | 3/1971 | Robinson |
| 3,605,995 | A | 9/1971 | Maack |

(Continued)

FOREIGN PATENT DOCUMENTS

GB 472560 9/1937

OTHER PUBLICATIONS

Skips Originals, Toobies-Shot, Lead Free Fly Fishing Weights, http://skipsoriginals.com/Products.aspx, Mar. 14, 2012.

Primary Examiner — Darren W Ark
Assistant Examiner — George Andonyan
(74) Attorney, Agent, or Firm — Frederick J. M. Price; Bond Schoeneck & King, PLLC

(57) ABSTRACT

The present invention relates to a shot applicator device and, more particularly, to an automatic shot applicator device including a housing with a shot storage/delivery chamber, a tip structured to deliver the shot into tubing attached to various fishing tackle/equipment including fishing rigs, line, hooks, leaders, fly fishing tippet, and/or inserting directly into lures and baits, thereby changing the density (add or decrease weight) of the fishing tackle/equipment, and a mechanism structured to apply a force to the shot thrusting it through the tip and into such material.

12 Claims, 12 Drawing Sheets

SECTION A-A

(56) References Cited

U.S. PATENT DOCUMENTS

| | | | |
|---|---|---|---|
| 3,815,798 A | 6/1974 | Lavitch et al. | |
| 3,893,612 A | 7/1975 | Bone | |
| 4,166,466 A | 9/1979 | Jarvik | |
| 4,333,596 A | 6/1982 | Kunreuther | |
| 4,377,027 A | 3/1983 | Price | |
| 4,597,753 A | 7/1986 | Turley | |
| 4,988,335 A | 1/1991 | Prindle et al. | |
| 5,054,658 A | 10/1991 | Aronie | |
| 5,517,782 A | 5/1996 | Link et al. | |
| 5,603,435 A | 2/1997 | Fenwick | |
| 5,643,319 A * | 7/1997 | Green et al. | 606/218 |
| 5,669,543 A * | 9/1997 | Ueno | 227/67 |
| 5,755,371 A * | 5/1998 | Huang | 227/71 |
| 5,930,937 A | 8/1999 | Bowersock | |
| 7,841,126 B2 | 11/2010 | Huppert | |
| 7,946,018 B2 | 5/2011 | Tokura et al. | |
| 8,529,550 B2 * | 9/2013 | Rosenman | A61B 17/3468 604/181 |
| 2008/0087703 A1 * | 4/2008 | Bailly | A61B 17/0401 227/67 |
| 2008/0255501 A1 * | 10/2008 | Hogendijk | A61B 17/562 604/64 |
| 2010/0000505 A1 | 1/2010 | Yeh | |
| 2011/0220088 A1 * | 9/2011 | Maggiore | 124/76 |

* cited by examiner

SECTION A-A
FIG. 7B

SHOT APPLICATOR DEVICE

RELATED APPLICATION DATA

The present application claims priority to U.S. provisional patent application No. 61/527,314, filed on Aug. 25, 2011; all of the foregoing patent-related document(s) are hereby incorporated by reference herein in their respective entirety(ies).

BACKGROUND OF THE INVENTION

1. Field of the Invention

The present invention relates to a shot applicator device and, more particularly, to an automatic shot applicator device including a housing with a shot storage area and/or delivery chamber, a tip structured to deliver the shot into tubing attached to various fishing tackle/equipment including fishing rigs, line, hooks, leaders, fly fishing tippet, and/or inserting directly into lures and baits, thereby changing the density (add or decrease weight) of the fishing tackle/equipment, and a mechanism structured to apply a force to the shot thrusting it through the tip and into such material.

2. Description of the Related Art

Ball shaped sinkers, or shots, are used in the fishing industry to add weight to fishing lines. These ball shaped sinkers are usually made of malleable metal, sufficient to create a slit therein ("split shot") so that the shot can be attached to fishing line (by inserting the line into the slit and applying pressure to both sides of the slit to close the slit over the line).

Many conventional shot applicator tools/devices require a mechanism to create a slit in the shot so that it can be attached to fishing line. For example, U.S. Pat. No. 3,914,976 describes a tool which includes a pair of handle-operated jaws which receive a spring-fed rod therein for the severing of an end portion of the rod and a die-forming of the severed portion about a received line. In conjunction with the severing of the rod portion, a rod section immediately adjacent thereto is provided with a slit which is to receive the line as the subsequent portion of the rod is severed from the rod and die-formed about the line.

Another example is the Dinsmores Products shot applicator device, which is called the "Auto-Shot." This device also requires the formation of a slit in the shot so that it can be attached to fishing line.

One conventional shot applicator tools/device does not require the formation of a slit in the shot so that it can be attached to fishing line includes the Toobies-Shot™. However, the Toobies-Shot™ device installs the shot into tubing by manually pushing the shot into the tubing. Moreover, the shot must be magnetic for the tool to work. The tip of the tool is magnetized to hold the shot in place.

Description of the Related Art Section Disclaimer: To the extent that specific publications/devices are discussed above in this Description of the Related Art Section, these discussions should not be taken as an admission that the discussed publications/devices are prior art for patent law purposes. For example, some or all of the discussed publications/devices may not be sufficiently early in time, may not reflect subject matter developed early enough in time and/or may not be sufficiently enabling so as to amount to prior art for patent law purposes. To the extent that specific publications/devices are discussed above in this Description of the Related Art Section (as well as throughout the application), they are all hereby incorporated by reference into this document in their respective entirety(ies).

SUMMARY OF THE INVENTION

The present invention recognizes that there are potential problems and/or disadvantages with the conventional shot applicator tools/devices. First, lead split shots and sinkers have been partially or fully banned in several states and countries, including New York, Washington, New Hampshire, Maine, Vermont, Massachusetts, Denmark, Great Britain, and parts of Canada due to their toxicity to migratory water fowl and humans. (There is currently a petition before the EPA under the Toxic Substances Control Act that seeks to ban lead in ammunition, fishing tackle and sinkers in the U.S.). Young children are especially susceptible to lead poisoning. Second most lead alternatives on the market are made of malleable materials like: bismuth and tin which have a lower density than lead, therefore greater volumes are needed to provide the same effect as their lead counterpart. Third, many split shot type sinkers can damage the leader when applied, when the split shot is squeezed onto the line it can flatten or put small nicks in the line which can cause the line to break prematurely and cannot be easily removed or repositioned without causing damage to the line, tippet, or leader. Fourth, conventional split shots can cause a hinging effect when casting. Fifth, all current shot systems are limited by the type of material the shot has to be made of, e.g., the material needs to be a malleable material or a magnetic material. Sixth, most shots cannot be used over and over infinitely without damage. Seventh, conventional shot applicator tools/devices that are used to insert shots into tubing only have the ability to manually (i.e., these devices do not have a mechanism to automatically apply a force to the shot so that it may enter the tubing) do so, and only can do so with magnetic material. Various embodiments of the present invention may be advantageous in that they may solve or reduce one or more of the potential problems and/or disadvantages discussed in this paragraph.

Various embodiments of the present invention may exhibit one or more of the following objects, features and/or advantages:

It is therefore a principal object and an advantage of the present invention to provide an automatic shot applicator device and shots used in conjunction therewith in which at least one, and preferably all of the above-referenced problems are addressed.

It is another object and advantage of the present invention to provide an automatic shot applicator device that is structured to insert shots into flexible tubing or like material, and into artificial baits, lures (e.g., plastic/rubber frogs, minnows, worms, etc.) and/or live/dead real baits (e.g., minnows, frogs, etc.). The tubing is what holds the shot on the various fishing tackle/equipment, and it can vary in color, and can be transparent, translucent, or opaque. Thus, the automatic shot applicator device of an embodiment of the present invention eliminates the need to create slits in the shots in order for the shots to attach to fishing line and/or other fishing gear.

It is a further object and advantage of the present invention to provide an automatic shot applicator device that can serve as a storage device for the shots, without the need for a magnetic storage portion of the device.

It is a further object and advantage of the present invention to replace split shots and sinkers made from lead with shots made from non-toxic materials (e.g., tungsten alloys), which can be used by the automatic shot applicator device of an embodiment of the present invention.

It is another object and advantage of the present invention to provide a shot that is not limited to a particular shape (e.g., a sphere, even though "shots" are typically understood as being spherically-shaped), as it can be a variety of other infinite shapes as long as it is structured to function with the automatic shot applicator device of an embodiment of the present invention.

It is another object and advantage of the present invention to provide shots that are made from materials that can vary in density, thereby adding weight to fishing tackle/equipment including fishing rigs, line, hooks, leaders, fly fishing tippet, and/or lures and baits by using shots made from material that has a higher density than water (e.g., tungsten alloys—can be over 60% heavier than lead, and a smaller amount of the tungsten alloy material may be needed vs. lead) (act as a "sinker"), or decreasing the effective weight of this fishing tackle by using shots that have a lower density than water (act as a "float").

It is a further object and advantage of the present invention to provide shots that can be used in conjunction with or to replace other weights on Carolina Rigs, Dropshot Rigs, and the like.

It is another object and advantage of the present invention to provide shots that can be reused over and over infinitely without damage.

It is another object and advantage of the present invention to provide shots that can be made of a wide variety of materials. (not limited to malleable or a magnetic material).

It is a further object and advantage of the present invention to provide a mechanism to automatically apply a force to the shot (i.e., not have to be manually pushed) so that the shot may enter tubing or other material.

It is another object and advantage of the present invention to provide a sinker that can be easily repositioned on the fishing line without causing damage to the line or leader.

In accordance with the above-referenced objects and advantages, an embodiment of the present invention is directed to an automatic shot applicator device and shots used in conjunction therewith. The automatic shot applicator device can include a housing with a shot storage area and/or a delivery chamber, an entry point to the housing and chamber for insertion of the shots therein, a tip structured to deliver the shot into tubing attached to various fishing tackle/equipment including fishing rigs, line, hooks, leaders, fly fishing tippet, and/or into lures and baits, thereby changing the density (add or decrease weight) of the fishing tackle/equipment, and a mechanism structured to apply a force to the shot thrusting it through the tip and into such material. The mechanism can be a plunger (preferably bias member loaded, e.g., spring loaded).

The tubing is contemplated to be part of an embodiment of the present invention, which can comprise a system when used in conjunction with the automatic shot applicator device.

BRIEF DESCRIPTION OF THE DRAWINGS

The present invention will be more fully understood and appreciated by reading the following Detailed Description in conjunction with the accompanying drawings, in which.

DETAILED DESCRIPTION

The present invention will be more fully understood and appreciated by reading the following Detailed Description in conjunction with the accompanying drawings, wherein like reference numerals refer to like components.

As noted in the Summary of the Invention section, the automatic shot applicator device of an embodiment of the present invention is used to store and inject shots of varies sizes, shapes, materials, and densities into tubing or directly into fishing lures, thereby attaching shots to fishing gear, tackle, and baits, thus changing the density of the fishing gear.

Figure 1:
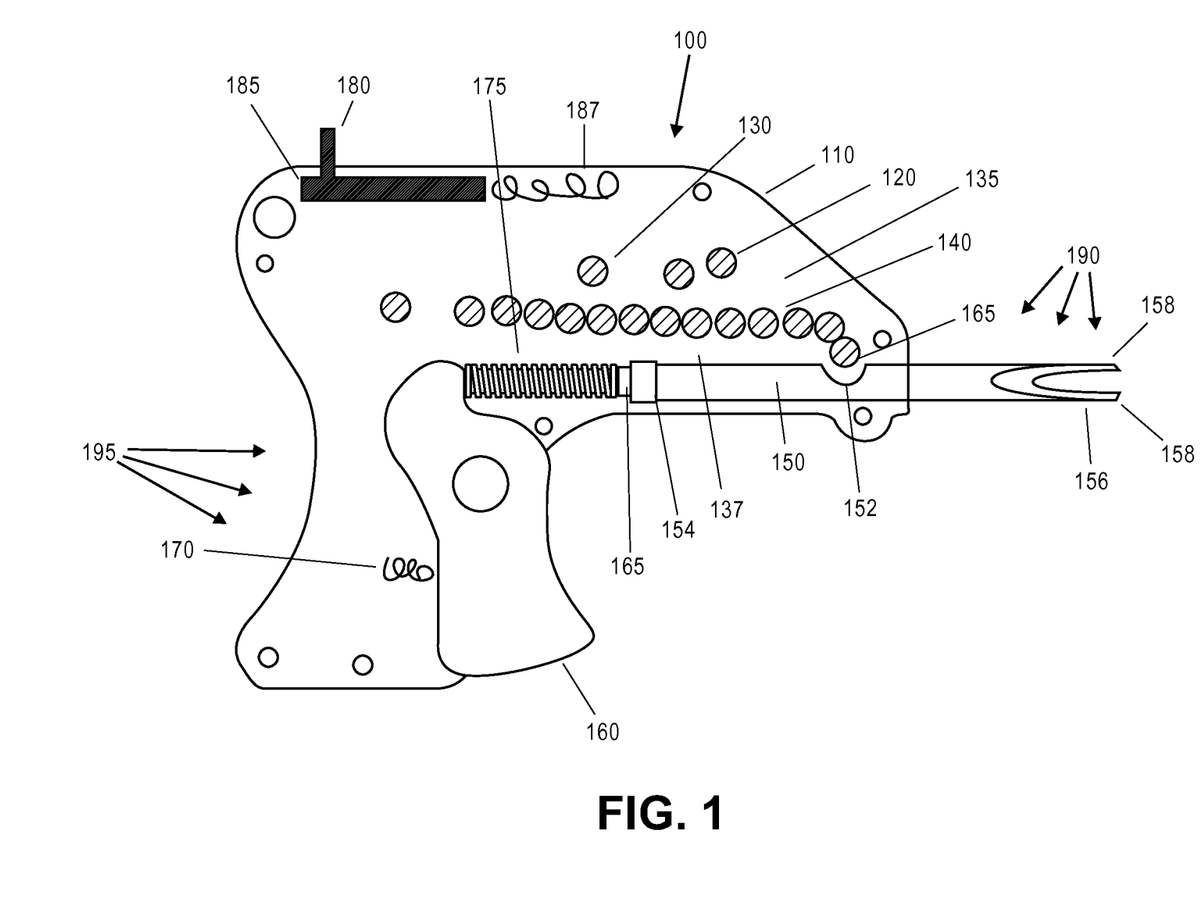
FIG. 1 shows a right side view of the automatic shot applicator device, according to an embodiment of the present invention.

Turning to FIG. 1, a right side view of the automatic shot applicator device 100 is shown, according to an embodiment of the present invention. This embodiment of the automatic shot applicator is "gun-shaped," and is designed to fit in the palm of the user's hand (although various iterations of the design are contemplated, including cosmetic and functional, some of which are discussed further below). The automatic shot applicator device 100 can include, but is not limited to, a housing 110 with a shot storage area 130 and/or a delivery chamber 140, shots 120, tip 150, shot entry point opening in the tip 152, proximal end of the tip 154, distal end of the tip 156, forked distal end of tip 158, trigger 160, bias member (e.g., coil spring, leaf spring and the like) 170 (with a biasing force on the trigger 160 towards the distal end 190 of the device), an alternative bias member (e.g., coil spring, leaf spring and the like) 175 (which surrounds mechanism 165 and has a biasing force on the trigger 160 towards the proximal end 195 of the device), slide mechanism 180, entry point opening 185, bias member (e.g., coil spring, leaf spring and the like) 187, which has a biasing force on the slide mechanism 180 towards the proximal end 195 of the device. The distal end 190 and proximal end 195 of the automatic shot applicator device 100 are shown, and a mechanism 165 (e.g., plunger) is structured to apply a force to the shot from the proximal end 195 thrusting it through the tip 150 toward the distal end 190.

A shot 120 can be loaded into the automatic shot applicator device 100 through the entry point opening 185 by sliding slide mechanism 180 towards the distal end 190 of the automatic shot applicator device 100 to reveal the entry point opening 185. When moving slide mechanism 180 in the distal direction, it moves in the direction opposite the biasing force of bias member 187. Thus, when a user releases slide member 180, the bias force of bias member 187 moves the slide member 180 in the proximal direction and preferably fully closes the entry point opening 185 (closes entry point opening 185 at least to the point where a shot may not fall out of the automatic shot applicator device 100).

Figure 2A:
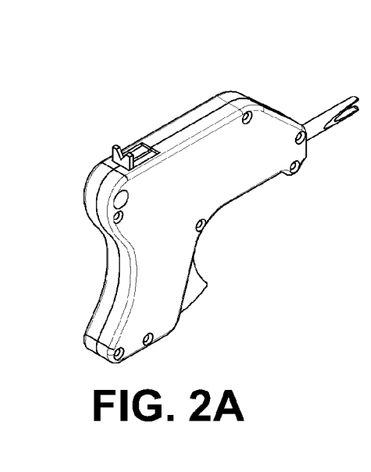
FIG. 2a-g shows various views of the automatic shot applicator device of FIG. 1 including a (a) back right side view, (b) section A-A of (e) right side view, (c) front right side view, (d) back view, (e) top view showing the section line A-A with which (b) was created, (f) right side view, and (g) front side view, according to an embodiment of the present invention.
Figure 2B:
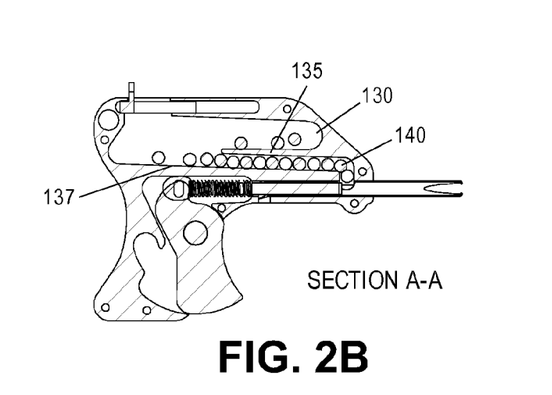
Figure 2C:
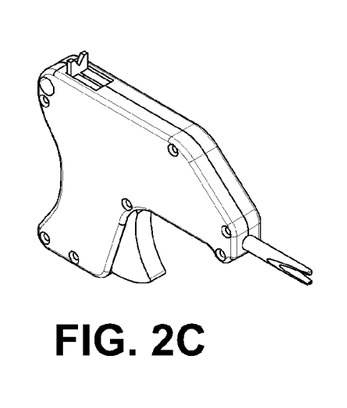
Figure 2D:
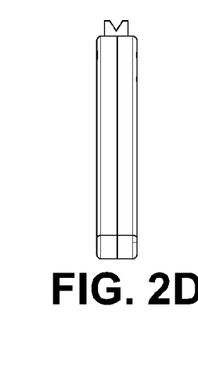
Figure 2E:
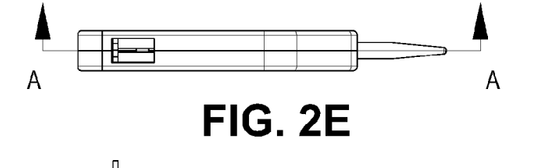
Figure 2F:
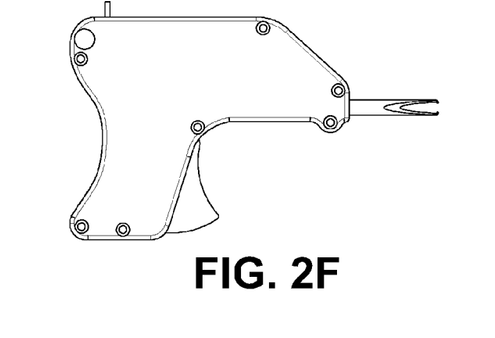
Figure 2G:
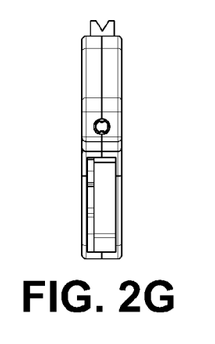

As best shown in FIG. 2(b), once in the automatic shot applicator device 100, shots 120 can be stored in shot storage area 130 and/or a delivery chamber 140. Separator 135 partially separates shot storage area 130 from the delivery chamber 140. Preferably, the separator 135 has is sloped (towards the proximal end 195 of the device in this embodiment, so that shots 120 can naturally make their way from the shot storage area 130 to the delivery chamber 140. Preferably the floor portion 137 of the delivery chamber 140 is sloped (toward the distal end 190 of the device in this embodiment), so that shots can naturally make their way from the delivery chamber 140 to shot entry point opening in the tip 152.

When shots 120 are in the tip 150, they can be delivered into tubing attached to various fishing tackle/equipment including fishing rigs, line, hooks, leaders, fly fishing tippet, and/or into lures and baits by the user when the user moves trigger 160 towards the proximal end 195 of the device, which in turn moves mechanism 165 toward the tip 156 and distal end 190 of the device. This movement of the trigger 160 is against the bias force exerted by either the bias member 170 or the alternative bias member 175. Thus, when the user is finished squeezing the trigger 160, the trigger 160 is moved back toward the distal end 190 and its "resting" position per the biasing force of either bias member 170/175, and the trigger pulls the mechanism 165 back to its "resting" position (as the mechanism 165 is attached at its proximal end to the trigger 160).

The tip 150 preferably is one piece of tubing (e.g., stainless steel) extending along a longitudinal axis and cut at an angle with small radius or curved "teeth-like" or pronged portions 158 at the tip's distal portion to (1) assist with the tip's insertion into a tube or into a lure or bait (as discussed further below), and (2) help prevent shot from leaving the tip 150 prior to use of the device 100. Each of the pronged portions begin at a proximal end portion and extend to a distal end portion. As shown in FIG. 2B, for example, each of the distal end portions curve towards the longitudinal axis in the direction from the proximal end portion to the distal end portion. Additionally, each of the pronged portions progressively taper thin to the distal end portion.

The length of the mechanism 165 can vary to allow for entry of at least one, and preferably more than one shot into the tip 150. This set-up also allows for delivery of at least one, and preferably multiple shots.

Turning to FIG. 2a-g, various views of the automatic shot applicator device 100 of FIG. 1 are shown including a (a) back right side view, (b) section A-A of (e) right side view, (c) front right side view, (d) back view, (e) top view showing the section line A-A with which (b) was created, (f) right side view, and (g) front side view, according to an embodiment of the present invention.

Figure 3:
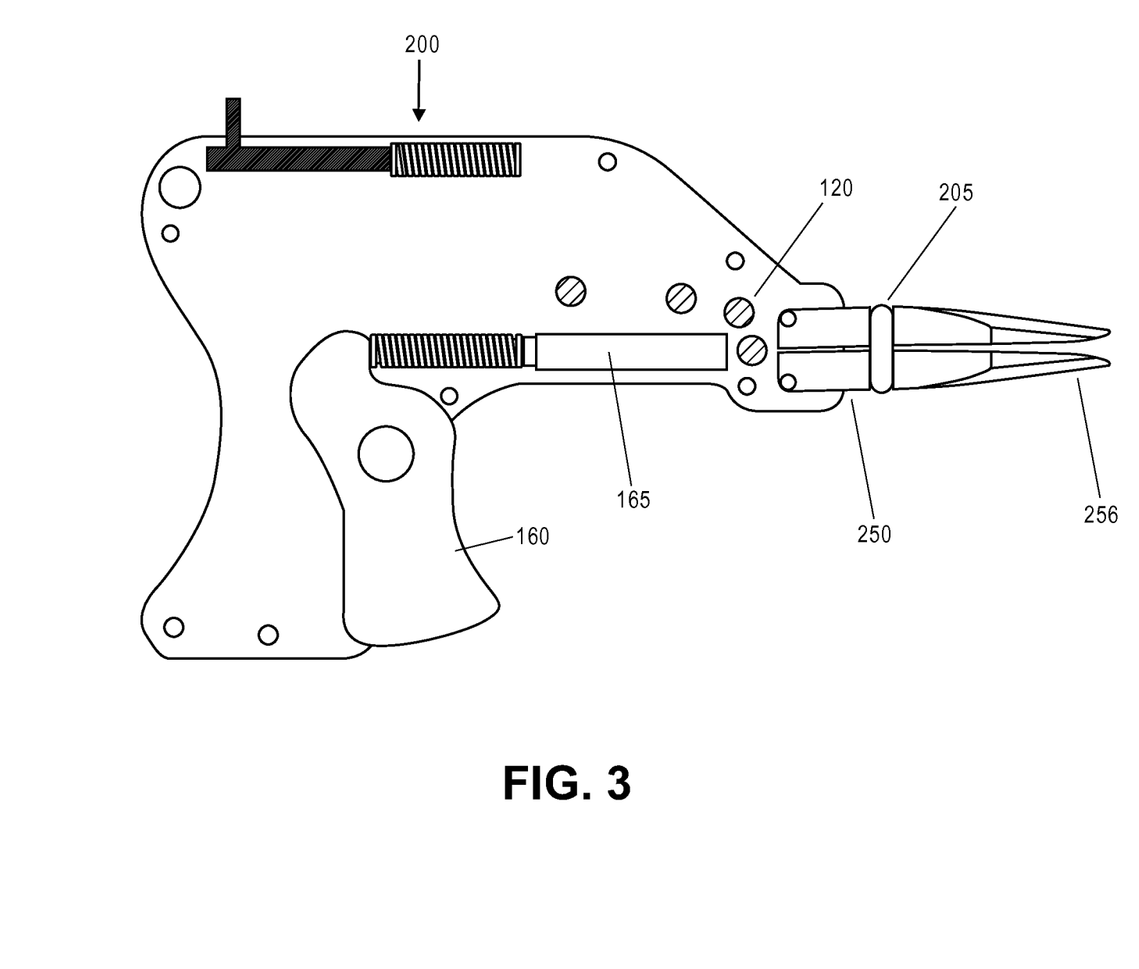
FIG. 3 is a right side view of the automatic shot applicator device, according to another embodiment of the present invention.
Figure 4A:
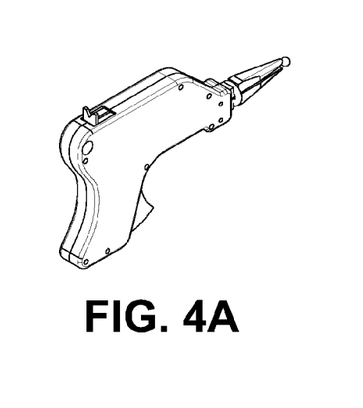
FIG. 4a-g show various views of the automatic shot applicator device of FIG. 3 including a (a) back right side view, (b) section A-A of (e) right side view, (c) front right side view, (d) back view, (e) top view showing the section line A-A with which (b) was created, (f) right side view, and (g) front side view, according to an embodiment of the present invention.
Figure 4B:
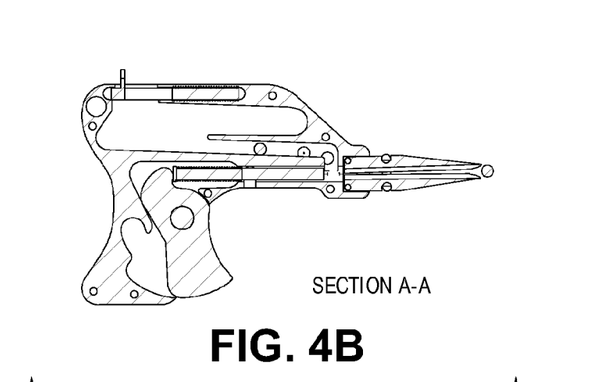
Figure 4C:
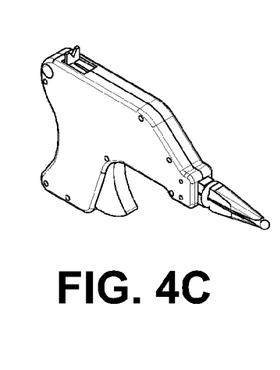
Figure 4D:
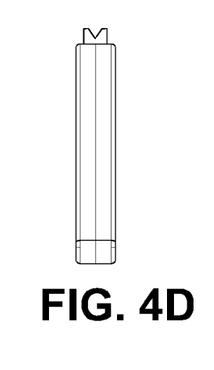
Figure 4E:
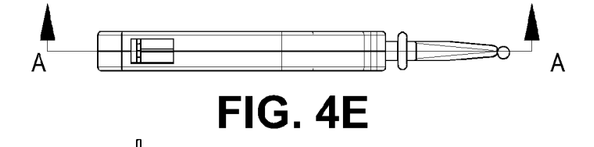
Figure 4F:
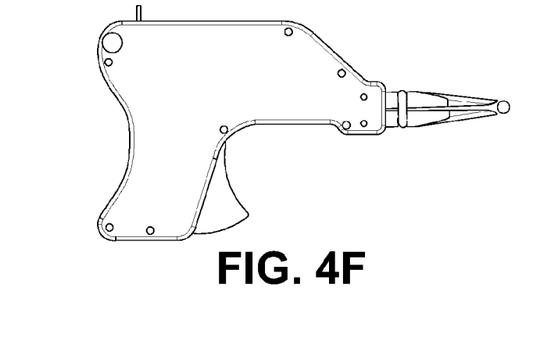
Figure 4G:
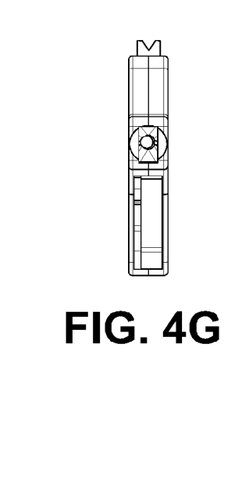

Turning to FIG. 3, a right side view of the automatic shot applicator device 200 is shown, according to another embodiment of the present invention. This embodiment of the automatic shot applicator is very similar to the embodiment shown and described with respect to FIG. 1, except for the tip portion 250 which includes an o-ring or spring 205 and hinged jaws 256. The o-ring, spring or other elastic device 205 keeps the end of the tips together thereby keeping the shot from falling out of the tip portion 250 when not in use and it keeps the end of the tips close together to aid in inserting into the tubing. When the plunger 165 is activated by squeezing the trigger 160 it pushes shot 120 into the tip 250 thereby separating the tip end 256 allowing the shot 120 to pass therethrough and be injected into the tubing (not shown).

Turning to FIG. 4a-g, various views of the automatic shot applicator device 200 of FIG. 3 are shown including a (a) back right side view, (b) section A-A of (e) right side view, (c) front right side view, (d) back view, (e) top view showing the section line A-A with which (b) was created, (f) right side view, and (g) front side view, according to an embodiment of the present invention.

Figure 5:
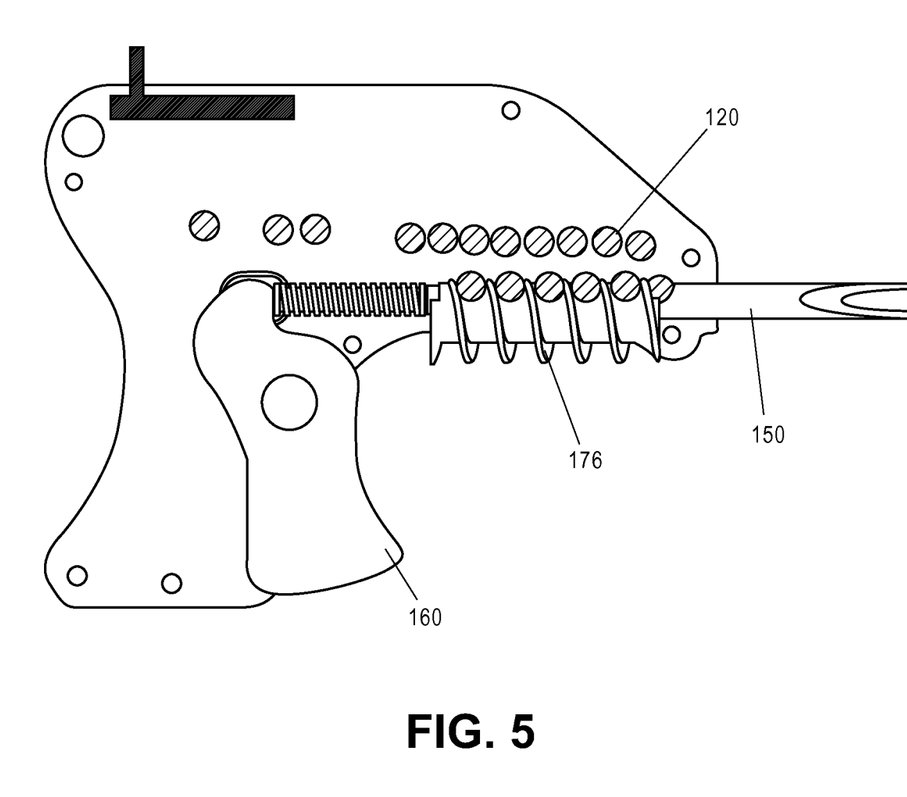
FIG. 5 shows a right side view of the automatic shot applicator device with a helical screw, according to another embodiment of the present invention.

Turning to FIG. 5, a right side view of the automatic shot applicator device with a helical screw is shown, according to another embodiment of the present invention. This embodiment of the automatic shot applicator with a helical screw is very similar to the embodiment shown and described with respect to FIG. 1, except the plunger 165 and return spring 175 have been replaced with a helical screw 176. The helical screw 176 is activated by a mechanical linkage to the trigger 160 or to an electric motor (not shown). The helix 176 is designed so that the shot 120 will fit into the helix, and when the helix is turned it will cause the shot to advance along the helix and into the tip 150. This action will generate force to push the shot through the tip 150 and into the tubing or bait (not shown).

Figure 6:
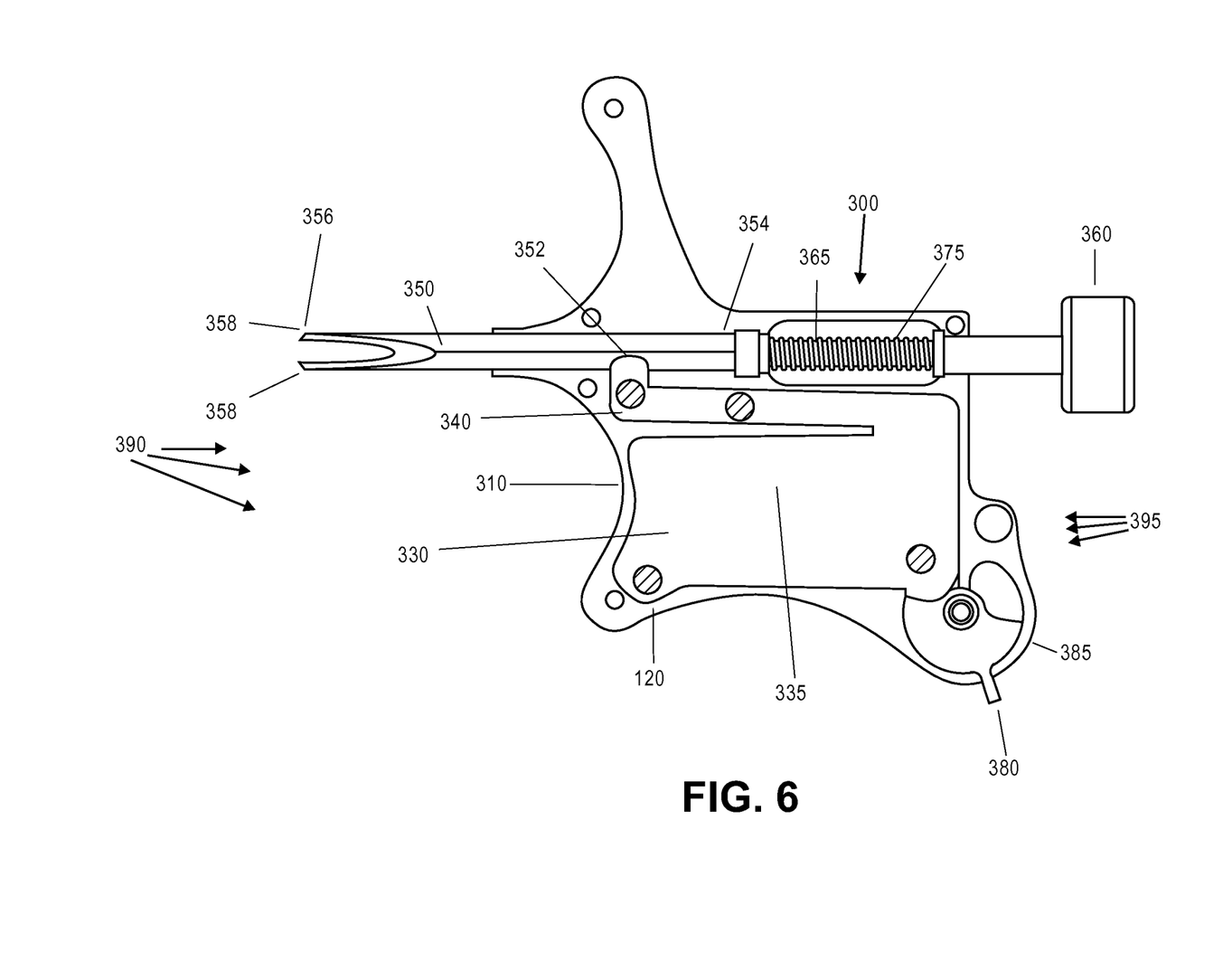
FIG. 6 is a left side view of the automatic shot applicator device, according to another embodiment of the present invention.
Figure 7A:
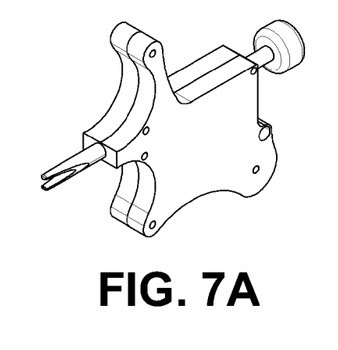
FIG. 7a-f show various views of the automatic shot applicator device of FIG. 6 including a (a) front left side view, (b) section A-A of (d) left side view, (c) back right side view (d) top view showing the section line A-A with which (b) was created, (e) left side view, and (f) front side view, according to an embodiment of the present invention.
Figure 7B:
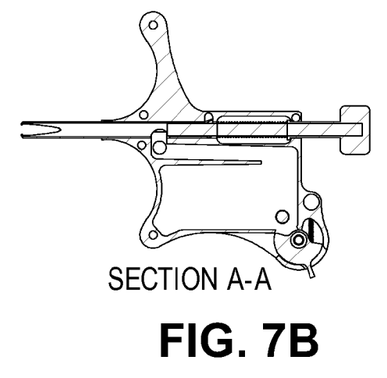
Figure 7C:
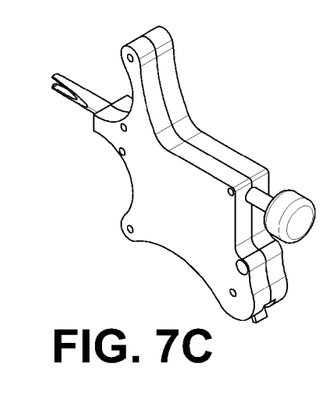
Figure 7D:
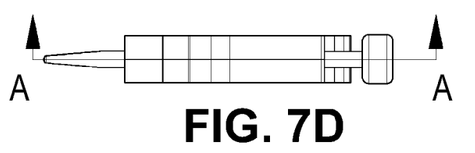
Figure 7E:
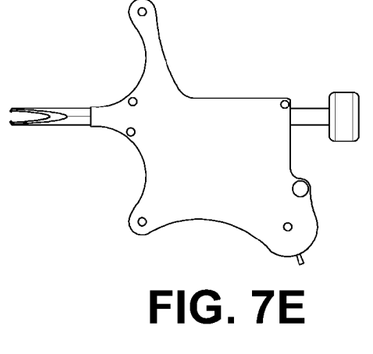
Figure 7F:
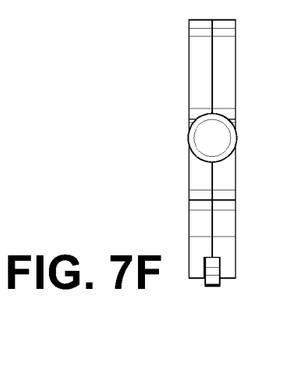

Turning to FIG. 6, a left side view of the automatic shot applicator device 300 is shown, according to an embodiment of the present invention. This embodiment of the automatic shot applicator is "amoeba-shaped," and is designed to fit in the palm of the user's hand. This embodiment is similar in many respects to the embodiment shown in FIG. 1, however, in place of the trigger 160 in FIG. 1, for example, FIG. 6 shows a user accessible end 360 of a mechanism 365 (as will be discussed in further detail below).

The automatic shot applicator device 300 can include, but is not limited to, a housing 310 with a shot storage area 330 and/or a delivery chamber 340, shots 120, tip 350, shot entry point opening in the tip 352, proximal end of the tip 354, distal end of the tip 356, forked distal end of tip 358, a user accessible end 360 of a mechanism 365 (e.g., a syringe style plunger), bias member (e.g., coil spring, leaf spring and the like) 375 (which surrounds mechanism 365 and has a biasing force towards the proximal end 395 of the device), slide mechanism 380, and entry point opening 385. The distal end 390 and proximal end 395 of the automatic shot applicator device 300 are also shown, and the mechanism 365 is structured to apply a force to the shot from the proximal end 395 thrusting it through the tip 350 toward the distal end 390.

A shot 120 can be loaded into the automatic shot applicator device 300 through the entry point opening 385 by sliding slide mechanism 380 towards the distal end 390 of the automatic shot applicator device 300 to reveal the entry point opening 385. A bias member, similar to bias member 187 in FIG. 1, could be incorporated into this embodiment to move the slide member 380 in the proximal direction and preferably fully close the entry point opening 385 (closes entry point opening 385 at least to the point where a shot may not fall out of the automatic shot applicator device 300).

Once in the automatic shot applicator device 300, shots 120 can be stored in shot storage area 330 and/or a delivery chamber 340. Separator 335 partially separates shot storage area 330 from the delivery chamber 340. This embodiment could incorporate the sloped design as described in connection with separator 135 and floor portion 137 of FIG. 1.

When the shot 120 is in the tip 350, it can be delivered into tubing attached to various fishing tackle/equipment including fishing rigs, line, hooks, leaders, fly fishing tippet, and/or into lures and baits by the user when the user moves user accessible end 360 towards the distal end 390 of the device, which in turn moves mechanism 365 toward the tip 356 and distal end 390 of the device. This movement of the user accessible end 360 is against the bias force exerted by the bias member 375. Thus, when the user is finished pushing the user accessible end 360 towards the distal end 390 of the device, the user accessible end 360 and mechanism 365 are moved back toward the proximal end and their "resting" positions per the biasing force of the bias member 375 exerted against the user accessible end 360 and mechanism 365.

The tip 350 preferably is one piece of tubing (e.g., stainless steel) cut at an angle with small radius or curved "teeth-like" portions 358 at the tip's distal portion to (1) assist with the tip's insertion into a tube or into a lure or bait (as discussed further below), and (2) help prevent shot from leaving the tip 350 prior to use of the device 300.

The length of the mechanism 365 can vary to allow for entry of at least one, and preferably more than one shot into the tip 350. This set-up also allows for delivery of at least one, and preferably multiple shots.

Turning to FIG. 7a-f, various views of the automatic shot applicator device 300 of FIG. 6 are shown including a (a) front left side view, (b) section A-A of (d) left side view, (c) back right side view (d) top view showing the section line A-A with which (b) was created, (e) left side view, and (f) front side view, according to an embodiment of the present invention.

Figure 8:
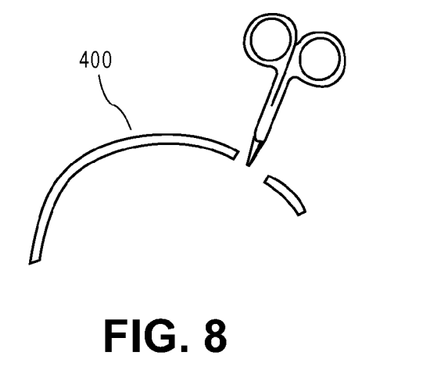
FIG. 8 is a picture illustrating the cutting of tubing, according to an embodiment of the present invention.
Figure 9:
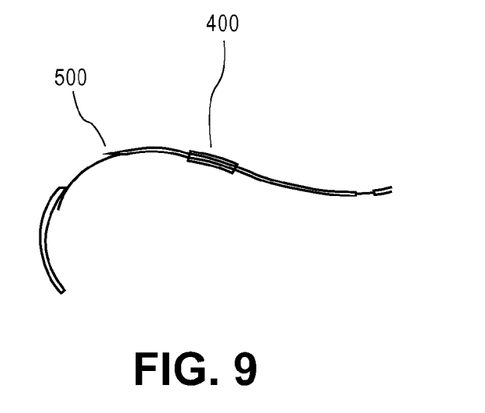
FIG. 9 is a picture illustrating the sliding of tubing over line, according to an embodiment of the present invention.
Figure 10:
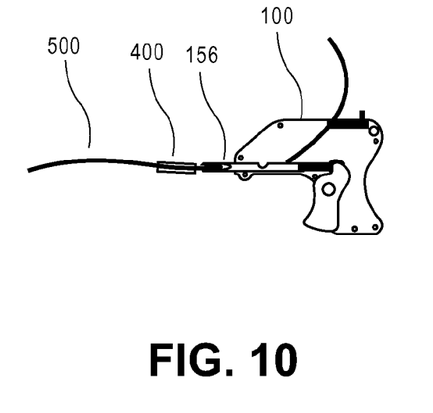
FIG. 10 is a picture illustrating the tip of the automatic shot applicator device of FIG. 1 being inserted into tubing, according to an embodiment of the present invention.
Figure 11:
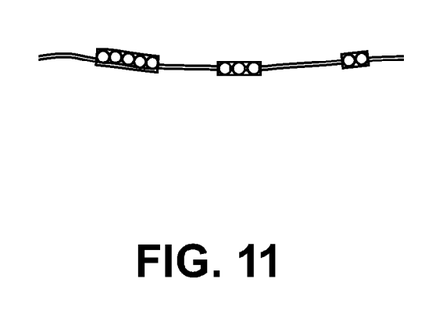
FIG. 11 is a picture illustrating shots within tubing attached to a line, according to an embodiment of the present invention.
Figure 12:
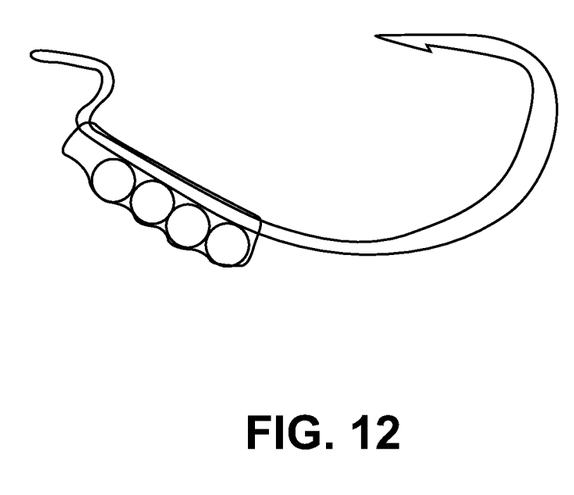
FIGS. 12-13 are pictures illustrating shots within tubing attached to hooks, according to an embodiment of the present invention.
Figure 13:
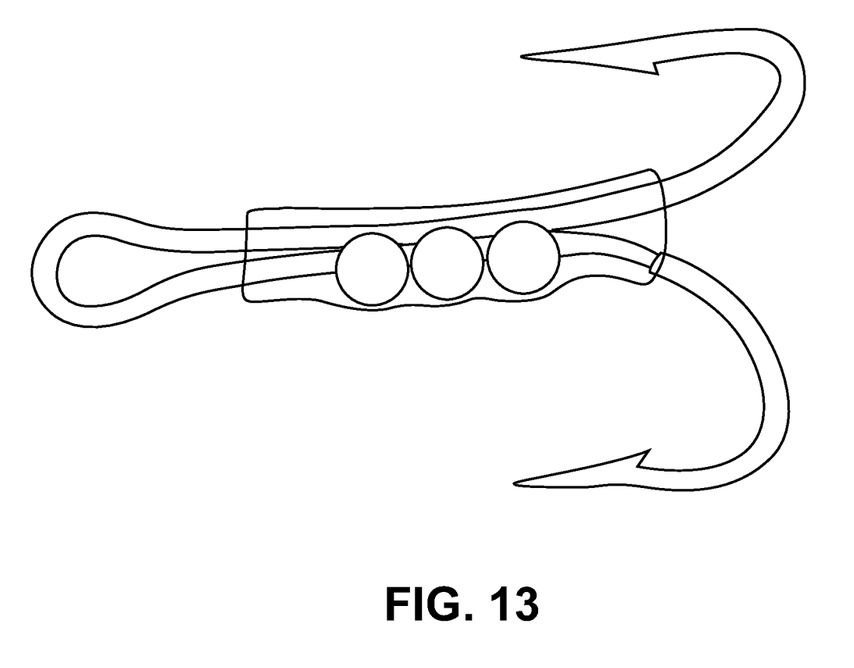
Figure 14:
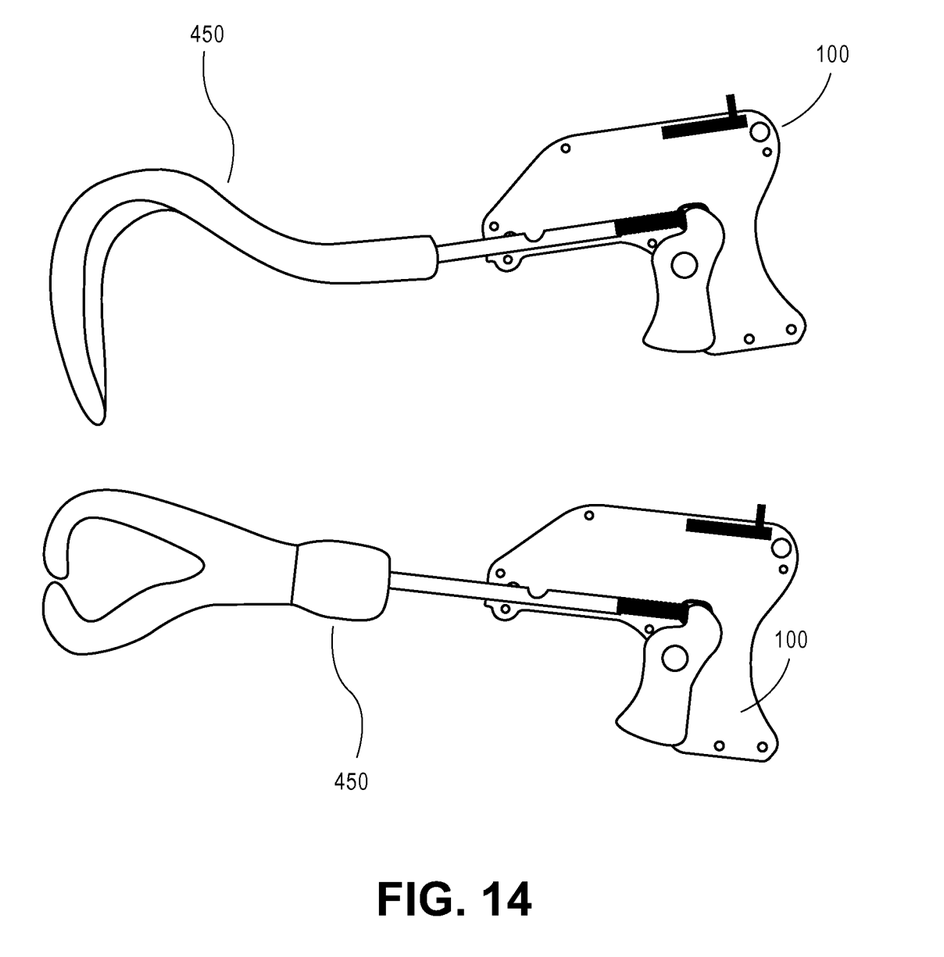
FIG. 14 is a picture of the automatic shot applicator device of FIG. 1 introducing shots directly into artificial (e.g., plastic or rubber) baits or lures without the use of tubing, according to an embodiment of the present invention.

The following discussion and Figures describe and show pictures of an example of the automatic shot applicator device 100 of FIG. 1 in use. First, shot 120 of desired density and size is loaded into the automatic shot applicator device 100. FIG. 8 shows cutting of tubing 400, and the length of the tubing is preferably proportional to the number of shots that will be injected therein. The tubing is then slid over line 500 (hook or leader, as shown in FIGS. 12-13) as shown in FIG. 9. FIG. 10 shows the tip 156 being inserted into tubing 400, at which point a user would squeeze trigger 160 to deploy shot 120 (as described above) to insert the desired number of shots 120 into tube 400. FIG. 11 shows shots 120 within the tubing 400 attached to the line 500. FIG. 14 shows automatic shot applicator device 100 introducing shots 120 directly into artificial (e.g., plastic or rubber) baits or lures 450 without the use of tubing 400.

Other embodiments of the automatic shot applicator device contemplated by the inventor include an electromechanically activated automatic shot applicator device. In this embodiment, an electro-mechanical device such as a small motor and gearing could be used to operate a plunger or helical screw, for example, to create the force needed to injected shots into the tubing or into baits and lures, etc.

Figure 15:
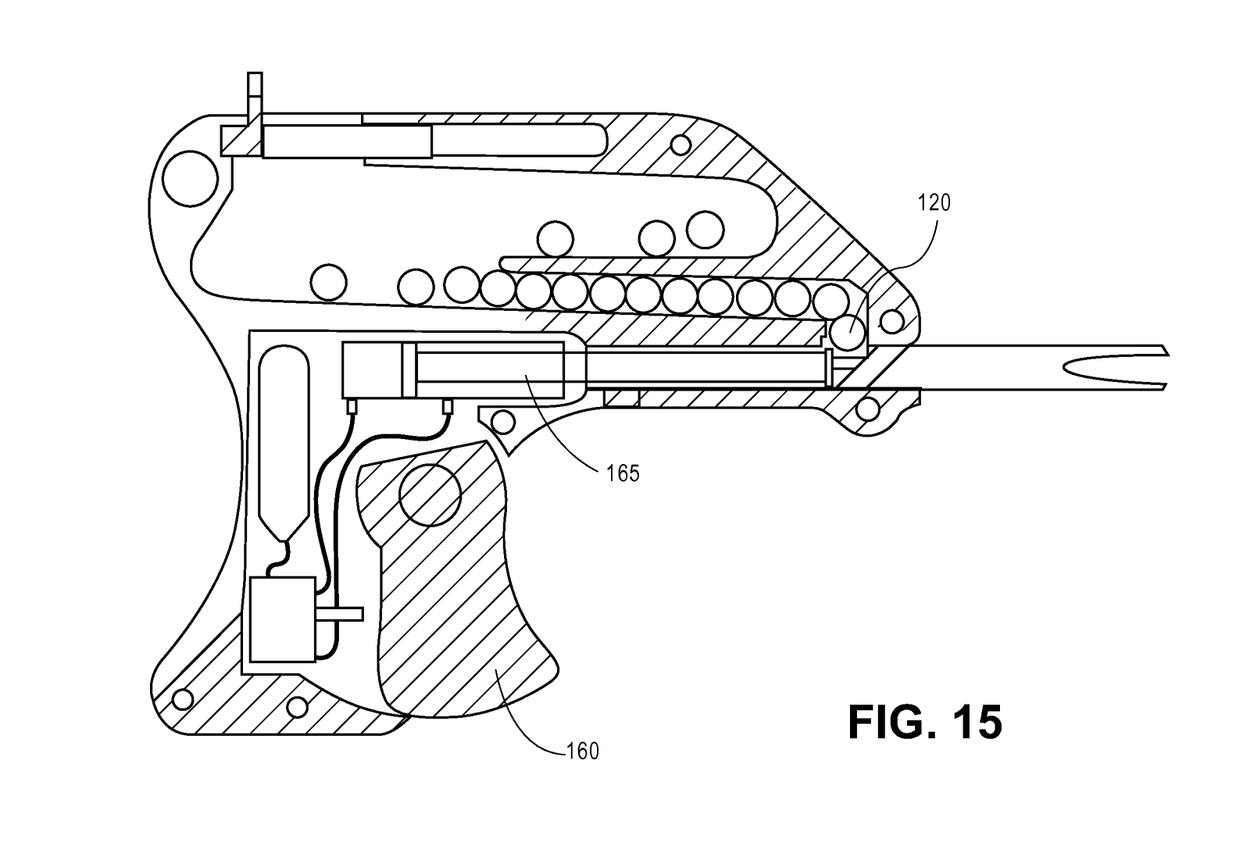
FIG. 15 is a right side view of the automatic shot applicator device which is gas/fluid activated, according to an embodiment of the present invention.

Another embodiment can include a gas/fluid activated (e.g., compressed air, co2, pneumatic, hydraulic) automatic shot applicator device (see FIG. 15). In this embodiment, shots could be injected into the tubing or into baits and lures, etc., using a compressed gas to create the force to insert shots directly, or a compressed gas could be used to activate a plunger or other mechanism to inject the shot. The trigger 160 can activate a 2 or 3 way pneumatic valve 161 which is connected to a pressure vessel 162. The valve 161 is also connected to a pneumatic cylinder which is connected to the plunger 165. When the trigger 160 is activated, the compressed gas/fluid will travel through line #1 which is connected to the back side of the pneumatic cylinder 163 thereby creating a force that will propel the cylinder rod and the plunger 165 forward, thereby injecting the shot 120. When the trigger 160 is released the pressure will be switched to line #2 thereby returning the plunger 165 to the "resting" position. The return stroke could also be done with a spring instead of the compressed gas/fluid.

Although the automatic shot applicator device of an embodiment of the present invention is described above with reference to fishing applications, it is also contemplated that the automatic shot applicator device could be used for non-fishing applications, consumer product and/or electronics, to attach shot in or on other material.

While several embodiments of the invention have been discussed, it will be appreciated by those skilled in the art that various modifications and variations of the present invention are possible. Such modifications do not depart from the spirit and scope of the present invention.

What is claimed is:

1. An automatic shot applicator device comprising:
   a housing;
   a hollow tube tip connected to said housing and extending along a longitudinal axis comprising a proximal end and a distal end, wherein said distal end of said hollow tube tip comprises a forked end formed therein comprising two pronged portions separated by an open slot, wherein each of the pronged portions begin at a proximal end portion and extend to a distal end portion, wherein each of the distal end portions curve towards the longitudinal axis in the direction from the proximal end portion to the distal end portion, and wherein each of the pronged portions progressively taper thin from the proximal end portion to the distal end portion;
   a trigger connected to said housing; and
   a force mechanism connected to said trigger and structured to apply a force to a shot within said hollow tube tip in a first direction along the longitudinal axis toward said distal end of said hollow tube tip upon actuation of said trigger.

2. The automatic shot applicator device of claim 1, wherein each of said at least two pronged portions are substantially parallel.

3. The automatic shot applicator device of claim 1, further comprising a shot storage area structured to store shots.

4. The automatic shot applicator device of claim 1, further comprising a bias member structured to provide a biasing force to said trigger in a direction opposite to the direction of said actuation.

5. The automatic shot applicator device of claim 1, wherein said force mechanism is a plunger element.

6. The automatic shot applicator device of claim 1, wherein said force mechanism is a helical screw element.

7. The automatic shot applicator device of claim 3, further comprising a delivery chamber structured to allow delivery of shots into said hollow tube tip from said shot storage area.

8. The automatic shot applicator device of claim 3, wherein said housing further comprises an entry point opening structured to allow the loading of shots into said shot storage area.

9. The automatic shot applicator device of claim 7, wherein said hollow tube tip further comprises an opening structured to load the shots into said hollow tube tip from said delivery chamber.

10. The automatic shot applicator device of claim 4, wherein said bias member is connected to said force mechanism.

11. The automatic shot applicator device of claim 8, wherein said housing further comprises a slide member structured to move in said first direction to expose said hole and to move in a second direction to close said hole.

12. The automatic shot applicator device of claim 11, wherein said slide member is biased to close said hole by a bias member.

\* \* \* \* \*